US006461095B1

(12) United States Patent
Puska

(10) Patent No.: US 6,461,095 B1
(45) Date of Patent: Oct. 8, 2002

(54) ATV LIFT AND CARRY APPARATUS

(76) Inventor: David P. Puska, 3505 Oleta, El Dorado, AR (US) 71730

( * ) Notice: Subject to any disclaimer, the term of this patent is extended or adjusted under 35 U.S.C. 154(b) by 29 days.

(21) Appl. No.: 09/636,618

(22) Filed: Aug. 11, 2000

(51) Int. Cl.[7] .................................................. B60P 9/00
(52) U.S. Cl. ....................... 414/462; 414/540; 414/917; 224/401
(58) Field of Search ................................ 414/462, 540, 414/917, 547; 224/401, 921; 172/439

(56) References Cited

U.S. PATENT DOCUMENTS

| | | | | |
|---|---|---|---|---|
| 3,968,890 A | * | 7/1976 | Robson | 214/75 T |
| 5,456,564 A | * | 10/1995 | Bianchini | 414/462 |
| D370,758 S | | 6/1996 | Mccanse | |
| 5,662,451 A | * | 9/1997 | Muzzi et al. | 414/540 |
| 5,707,072 A | * | 1/1998 | Hopper | 280/491.5 |
| 5,746,275 A | * | 5/1998 | Cross et al. | 214/75 T |
| 5,884,930 A | * | 3/1999 | Cluth | 280/497 |
| 5,911,556 A | * | 6/1999 | Caldwell | 414/462 |
| 5,975,831 A | * | 11/1999 | Martin | 414/543 |
| 6,109,855 A | * | 8/2000 | Vela-Cuellar | 414/462 |
| 6,254,117 B1 | * | 7/2001 | Cross | 280/401 |
| 6,257,347 B1 | * | 7/2001 | Campisi | 172/439 |
| 6,276,666 B1 | * | 8/2001 | Roberts | 254/413 |

* cited by examiner

*Primary Examiner*—Joseph A. Fischetti

(57) ABSTRACT

An ATV lift and carry apparatus for lifting heavy objects upon the rack member mounted to an ATV. The ATV lift and carry apparatus includes a main support assembly being adapted to be securely attached to an ATV; and also includes a hitch mounting member being adapted to adjustably attach to a hitch of the ATV; and further includes a rack support member being pivotally mounted to the hitch mounting member; and also includes a rack member being pivotally attached to the rack support member and being adapted to be supported upon the ATV; and further includes a lift assembly for lifting objects upon the rack member.

17 Claims, 4 Drawing Sheets

ATV LIFT AND CARRY APPARATUS

BACKGROUND OF THE INVENTION

1. Field of the Invention

The present invention relates to a power lift for an ATV and more particularly pertains to a new ATV lift and carry apparatus for lifting heavy objects upon the rack member mounted to an ATV.

2. Description of the Prior Art

The use of a power lift for an ATV is known in the prior art. More specifically, a power lift for an ATV heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,662,451; 5,884,930; 3,968,890; 5,707,072; U.S. Patent No. Des. 370,758; and U.S. Pat. No. 5,746,275.

While these devices fulfill their respective, particular objectives and requirements, the aforementioned patents do not disclose a new ATV lift and carry apparatus. The inventive device includes a main support assembly being adapted to be securely attached to an ATV; and also includes a hitch mounting member being adapted to adjustably attach to a hitch of the ATV; and further includes a rack support member being pivotally mounted to the hitch mounting member; and also includes a rack member being pivotally attached to the rack support member and being adapted to be supported upon the ATV; and further includes a lift assembly for lifting objects upon the rack member.

In these respects, the ATV lift and carry apparatus according to the present invention substantially departs from the conventional concepts and designs of the prior art, and in so doing provides an apparatus primarily developed for the purpose of lifting heavy objects upon the rack member mounted to an ATV.

SUMMARY OF THE INVENTION

In view of the foregoing disadvantages inherent in the known types of power lift for an ATV now present in the prior art, the present invention provides a new ATV lift and carry apparatus construction wherein the same can be utilized for lifting heavy objects upon the rack member mounted to an ATV.

The general purpose of the present invention, which will be described subsequently in greater detail, is to provide a new ATV lift and carry apparatus which has many of the advantages of the power lift for an ATV mentioned heretofore and many novel features that result in a new ATV lift and carry apparatus which is not anticipated, rendered obvious, suggested, or even implied by any of the prior art power lift for an ATV, either alone or in any combination thereof.

To attain this, the present invention generally comprises a main support assembly being adapted to be securely attached to an ATV; and also includes a hitch mounting member being adapted to adjustably attach to a hitch of the ATV; and further includes a rack support member being pivotally mounted to the hitch mounting member; and also includes a rack member being pivotally attached to the rack support member and being adapted to be supported upon the ATV; and further includes a lift assembly for lifting objects upon the rack member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ATV lift and carry apparatus which has many of the advantages of the power lift for an ATV mentioned heretofore and many novel features that result in a new ATV lift and carry apparatus which is not anticipated, rendered obvious, suggested, or even implied by any of the prior art power lift for an ATV, either alone or in any combination thereof.

It is another object of the present invention to provide a new ATV lift and carry apparatus which may be easily and efficiently manufactured and marketed.

It is a further object of the present invention to provide a new ATV lift and carry apparatus which is of a durable and reliable construction.

An even further object of the present invention is to provide a new ATV lift and carry apparatus which is susceptible of a low cost of manufacture with regard to both materials and labor, and which accordingly is then susceptible of low prices of sale to the consuming public, thereby making such ATV lift and carry apparatus economically available to the buying public.

Still yet another object of the present invention is to provide a new ATV lift and carry apparatus which provides in the apparatuses and methods of the prior art some of the advantages thereof, while simultaneously overcoming some of the disadvantages normally associated therewith.

Still another object of the present invention is to provide a new ATV lift and carry apparatus for lifting heavy objects upon the rack member mounted to an ATV.

Yet another object of the present invention is to provide a new ATV lift and carry apparatus which includes a main support assembly being adapted to be securely attached to an ATV; and also includes a hitch mounting member being adapted to adjustably attach to a hitch of the ATV; and further includes a rack support member being pivotally mounted to the hitch mounting member; and also includes a rack member being pivotally attached to the rack support member and being adapted to be supported upon the ATV; and further includes a lift assembly for lifting objects upon the rack member.

Still yet another object of the present invention is to provide a new ATV lift and carry apparatus that allows for one person to easily and conveniently lift heavy objects upon the ATV.

Even still another object of the present invention is to provide a new ATV lift and carry apparatus that is safe to use and prevents users from straining and injuring their backs by lifting heavy objects upon the ATV's.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
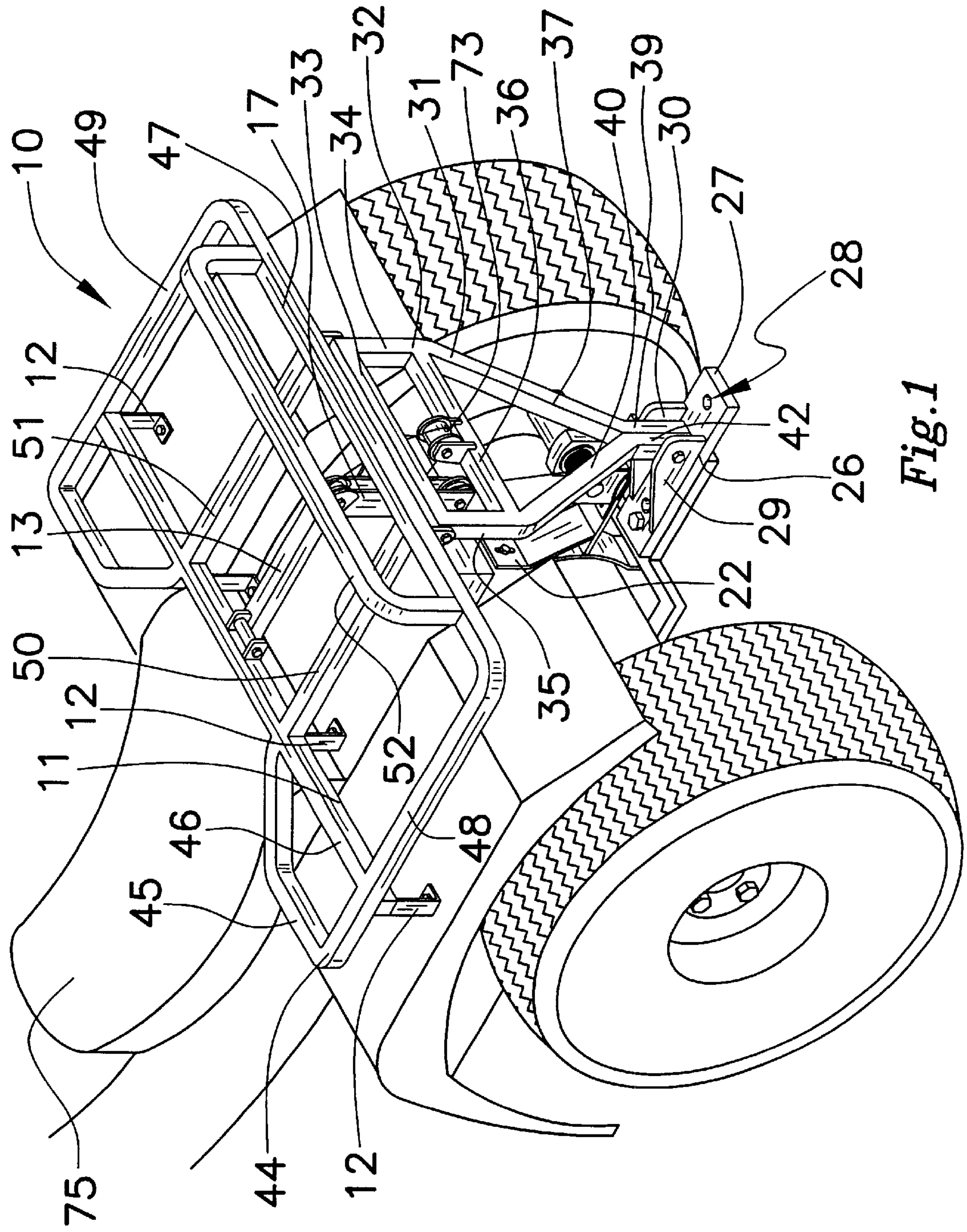
FIG. 1 is a perspective view of a new ATV lift and carry apparatus according to the present invention and being mounting to an ATV.
Figure 2:
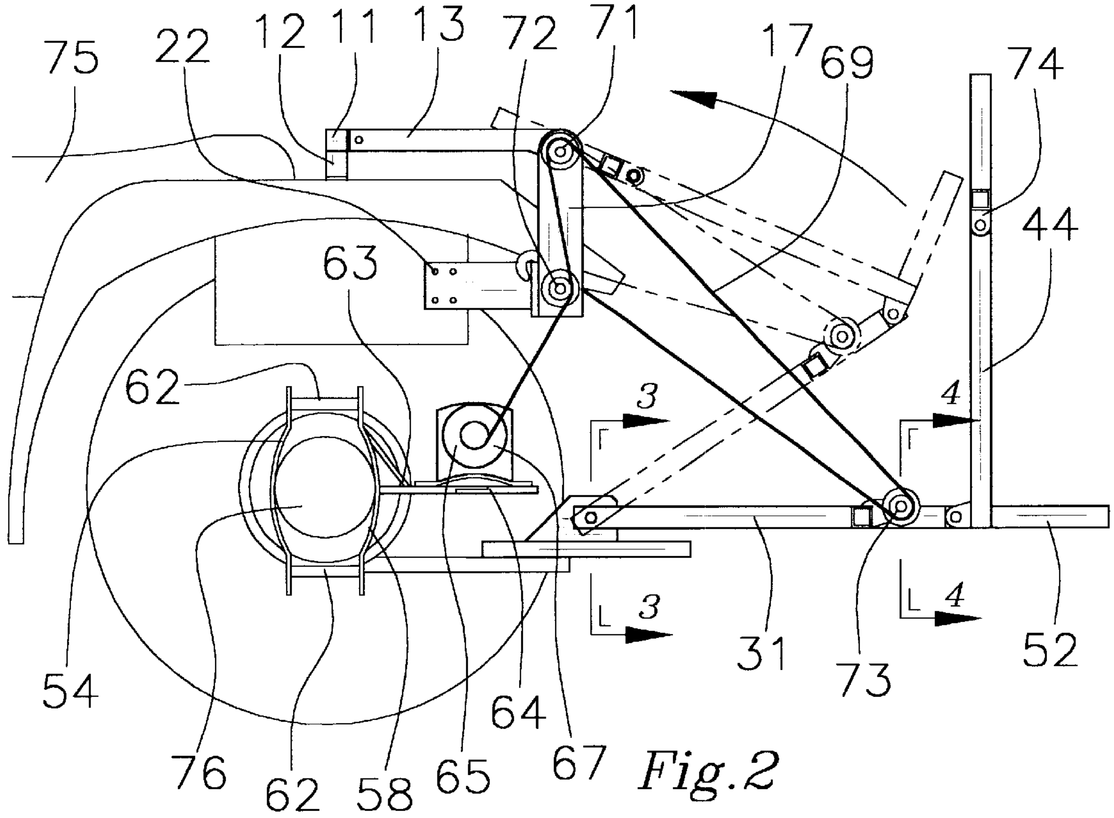
FIG. 2 is a side elevation view of the present invention being mounted to an ATV.
Figure 3:
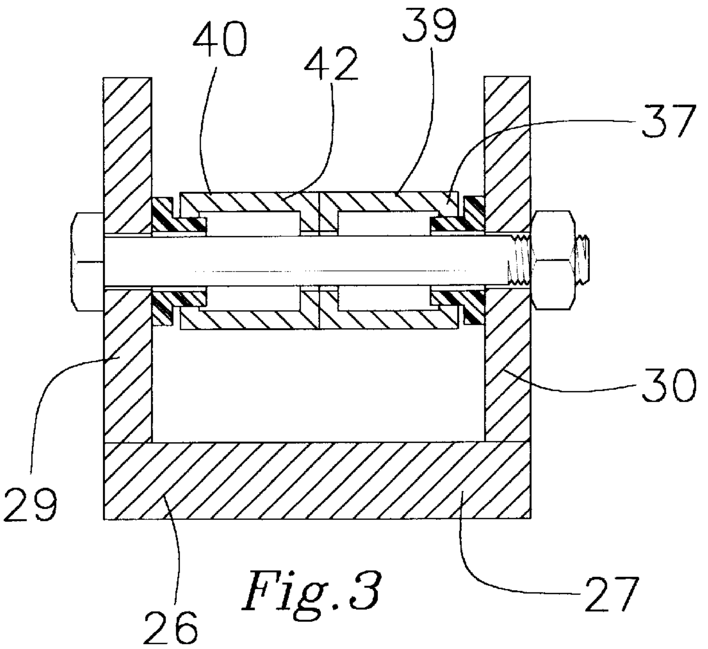
FIG. 3 is a cross-sectional view of the hitch mounting member of the present invention.
Figure 4:
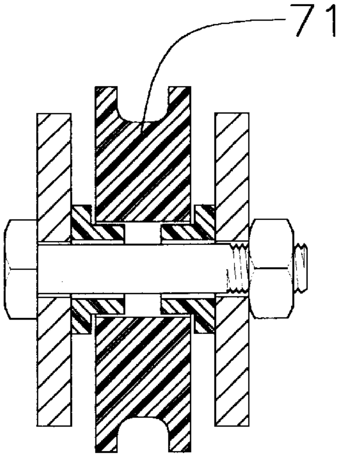
FIG. 4 is a cross-sectional view of one of the pulleys of the present invention.
Figure 5:
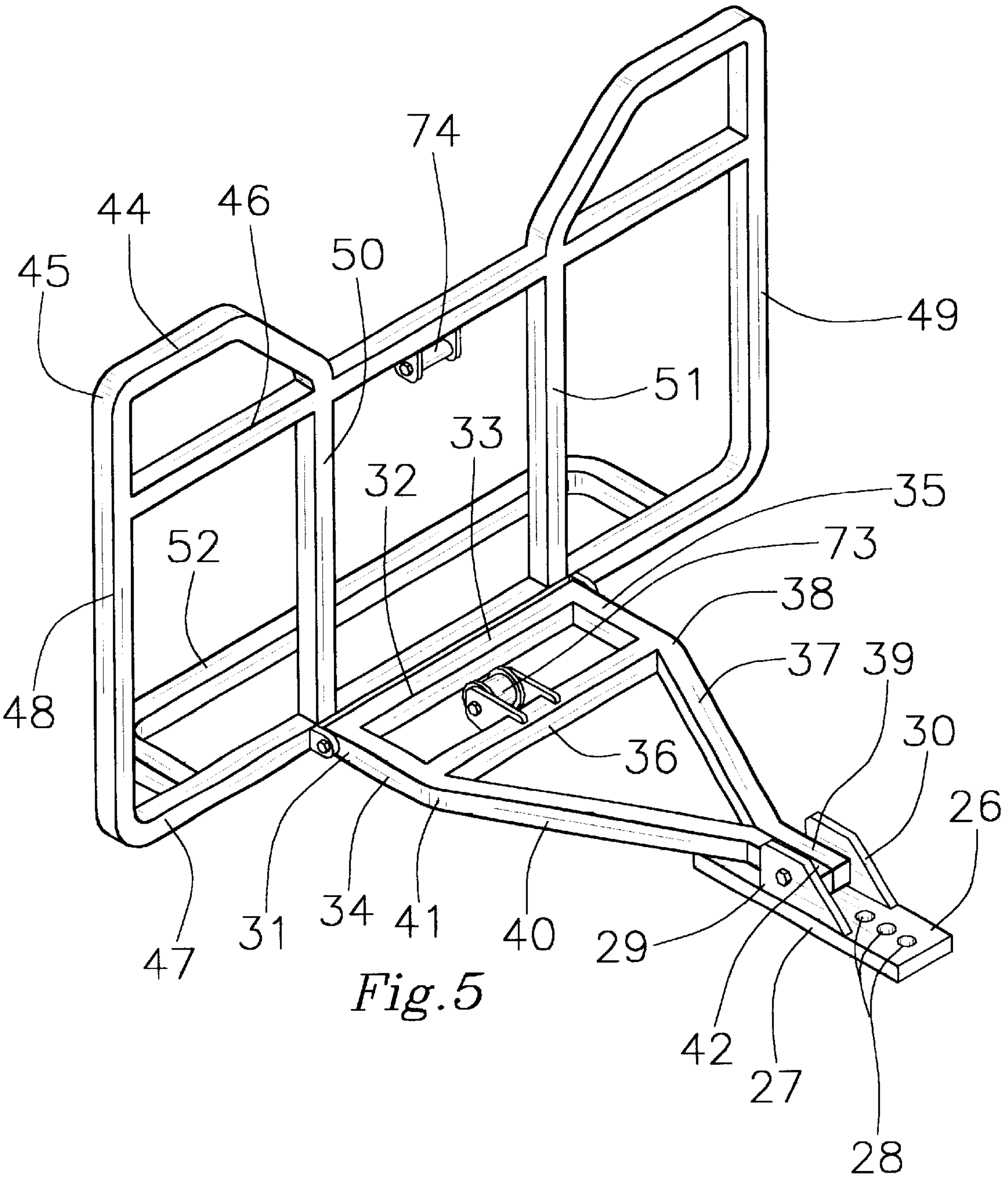
FIG. 5 is a perspective view of the rack support member, hitch mounting member, and the rack member of the present invention.
Figure 6:
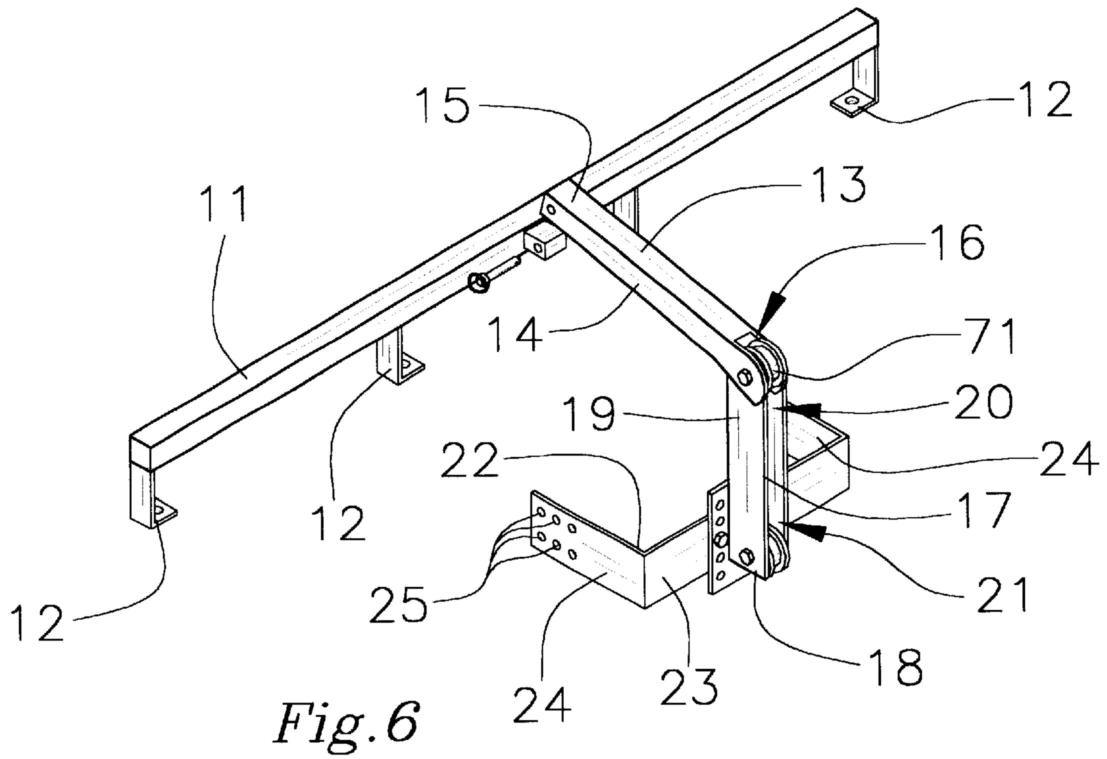
FIG. 6 is a perspective view of the main support assembly of the present invention.
Figure 7:
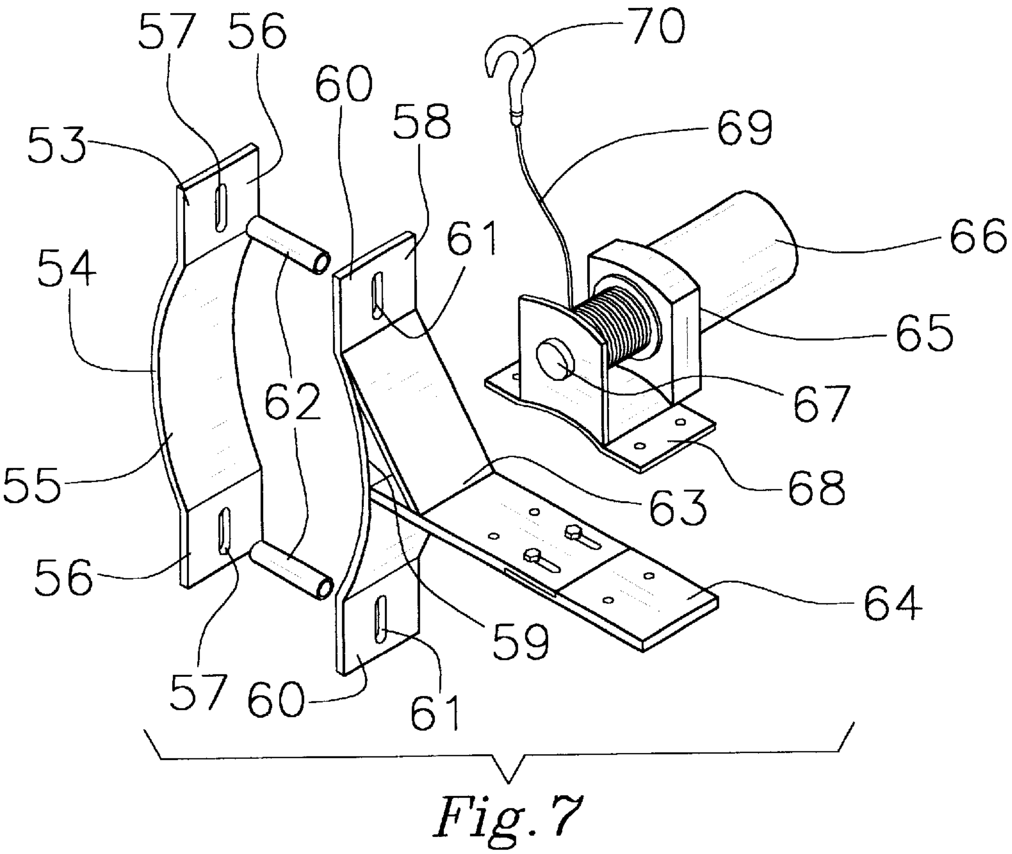
FIG. 7 is a perspective view of the lift assembly of the present invention.

With reference now to the drawings, and in particular to FIGS. 1 through 7 thereof, a new ATV lift and carry apparatus embodying the principles and concepts of the present invention and generally designated by the reference numeral 10 will be described.

As best illustrated in FIGS. 1 through 7, the ATV lift and carry apparatus 10 generally comprises a main support assembly being adapted to be securely attached to an ATV. The main support assembly includes a first elongate member 11, a plurality of bracket members 12 being securely and conventionally attached to the first elongate member 11 and being adapted to fasten to the ATV 75, and also includes a first arm member 13 having a first end 14 and a second end 15 which is securely and conventionally attached and welded to the first elongate member 11, and further includes a second arm member 17 having a first end 18 and a second end 19 which is pivotally and conventionally attached to the first end 14 of the first arm member 13, and also includes a mounting bracket 22 being securely and conventionally attached at the first end 18 of the second arm member 17 and being adapted to securely fasten to a back of the ATV 75. The first arm member 13 includes a slot 16 disposed in the first end 14 thereof, and the second arm member 17 includes slots 20,21 disposed in the first 18 and second 19 ends thereof. The mounting bracket 22 includes a main portion 23 which is securely attached to the second arm member 17, and also includes end portions 24 which are integrally connected to the main portion 23 and which are angled relative to the main portion 23 with each of the end portions 24 having a plurality of holes 25 disposed therethrough for mounting the mounting bracket 22 to the ATV 75.

A hitch mounting member 26 is adapted to adjustably attach to a hitch of the ATV 75. The hitch mounting member 26 includes a plate-like member 27 having a plurality of holes 28 disposed therethrough for adjustably mounting the hitch mounting member 26 to the hitch of the ATV 75, and also includes brackets 29,30 being securely and conventionally attached to sides of the plate-like member 27 and extending outwardly therefrom.

A rack support member 31 is pivotally and conventionally mounted to the hitch mounting member 26. The rack support member 31 includes a frame 32 having an elongate end member 33, and also has elongate side members 34,35 securely and conventionally attached at ends of the elongate end member 33, and further has a cross member 36 extending between and being securely and conventionally attached to the elongate side members 34,35, and also has elongate converging members 37,40 each having a first end 38,41 being securely and conventionally attached to a respective elongate side member 34,35 and each having a second end portion 39,42 which is securely and conventionally attached to the second end portion 39,42 of the other the elongate converging member 37,40 with the second end portions 39,42 of the elongate converging members 37,40 being pivotally attached with a fastener to the brackets 29,30 of the hitching mounting member 26.

A rack member 44 is pivotally and conventionally attached to the rack support member 31 and is adapted to be supported upon the ATV 75. The rack member 44 includes a frame 45 having elongate end 46,47 and side 48,49 members and elongate cross members 50,51, and also includes a support bar 52 being securely attached to and spaced from the frame 45, and further includes brackets being securely and conventionally attached to one of the elongate end members 47 of the frame 45 for pivotally mounting the rack member 44 to the elongate side members 34,35 of the rack support member 31.

A lift assembly for lifting objects upon the rack member 44 includes a winch mounting member 53 which is adapted to securely fasten to an axle 76 of the ATV 75, and also includes a winch 65 being securely and removably mounted to the winch mounting member 53 and having a motor 66, a spool 67 conventionally connected to the motor 66, a cable 69 carried by the spool 67 and having a hook 70 at an end of the cable 69, and a winch bracket member 68 for mounting to the winch mounting member 53, and further includes a first pulley 71 being conventionally mounted in the slot 16 of the first arm member 13 and in the slot 20 of the second end 19 of the second arm member 17, and also includes a second pulley 72 being conventionally mounted in the slot 21 in the first end 18 of the second arm member 17, and further includes a roller member 74 being conventionally mounted to one of the elongate end members 46 of the frame 45 of the rack member 44, and also includes a third pulley 73 being conventionally mounted to the cross member 36 of the rack support member 31 with the pulleys 71–73 and the roller member 74 being adapted to carry the cable 69. The winch mounting member 53 includes a pair of arcuate plate-like members 54,58, and also includes a pair of spacing members 62 securely and conventionally attached to and extending outwardly from one 54 of the arcuate plate-like members and being in contactable relationship with the other 58 of the arcuate plate-like members, and further includes a mounting plate support member 63 being securely and conventionally attached to and extending outwardly from one 58 of the arcuate plate-like members, and also includes a winch mounting plate 64 being adjustably fastened to the mounting plate support member 63 and being adapted to support the winch 65. Each of the arcuate plate-like members 54,58 includes a curved main portion 55,59 which is adapted to engage about the axle 76 of the ATV 75 and also includes end portions 56,60 having holes 57,61 disposed therethrough. The mounting plate support member 63 and the winch mounting plate 64 have holes disposed therethrough for allowing the winch mounting plate 64 to be adjustably fastened with fastening members to the mounting plate support member 63.

In use, the user pivots the rack member 44 and the rack support member 31 outwardly from the ATV 75 using the winch 65 and the cable 69 such that at least a portion of the rack support member 31 rests upon the ground. The user then fastens the heavy object against the rack member 44 and uses the winch 65 and cable 69 to pivot the rack member 44 upon the back end of the ATV 75 with the heavy object being securely mounted upon the rack member 44.

As to a further discussion of the manner of usage and operation of the present invention, the same should be apparent from the above description, Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ATV lift and carry apparatus comprising:

a main support assembly being adapted to be securely attached to an ATV;

a hitch mounting member being adapted to adjustably attach to a hitch of the ATV;

a rack support member being pivotally mounted to said hitch mounting member;

a rack member being pivotally attached to said rack support member and being adapted to be supported upon the ATV;

a lift assembly for lifting objects upon said rack member; and wherein said rack support member includes a frame having an elongate end member, and also having elongate side members securely attached at ends of said elongate end member, and further having a cross member extending between and being securely attached to said elongate side members, and also having elongate converging members each having a first end being securely attached to a respective said elongate side member and each having a second end portion which is securely attached to said second end portion of the other said elongate converging member, said second end portions of said elongate converging members being pivotally attached with a fastener to said hitching mounting member.

2. An ATV lift and carry apparatus as described in claim 1, wherein said main support assembly includes a first elongate member, a plurality of bracket members securely attached to said first elongate member and being adapted to fasten to the ATV, and also includes a first arm member having a first end and a second end, said second end of said first arm member being securely attached to said first elongate member, and further including a second arm member having a first end and a second end, said second end of said second arm member being pivotally attached to said first end of said first arm member, and also includes a mounting bracket being securely attached at said first end of said second arm member and being adapted to securely fasten to a back of the ATV.

3. An ATV lift and carry apparatus as described in claim 2, wherein said first arm member includes a slot disposed in said first end thereof, and said second arm member includes slots disposed in said first and second ends thereof.

4. An ATV lift and carry apparatus as described in claim 2, wherein said mounting bracket includes a main portion which is securely attached to said second arm member, and also includes end portions which are integrally connected to said main portion and which are angled relative to said main portion, each of said end portions having a plurality of holes disposed therethrough for mounting said mounting bracket to the ATV.

5. An ATV lift and carry apparatus as described in claim 1, wherein said hitch mounting member includes a plate-like member having a plurality of holes disposed therethrough for adjustably mounting said hitch mounting member to the hitch of the ATV, and also includes brackets securely attached to sides of said plate-like member and extending outwardly therefrom.

6. An ATV lift and carry apparatus as described in claim 1, wherein said rack member includes a frame having elongate end and side members and elongate cross members, and also includes a support bar being securely attached to and spaced from said frame, and further includes brackets being securely attached to one of said elongate end members of said frame for pivotally mounting said rack member to said elongate side members of said rack support member.

7. An ATV lift and carry apparatus as described in claim 6, wherein said lift assembly includes a winch mounting member which is adapted to securely fasten to an axle of the ATV, and also includes a winch being securely and removably mounted to said winch mounting member and having a motor, a spool connected to said motor, a cable carried by said spool and having a hook at an end of said cable, and a winch bracket member, and further includes a first pulley mounted in said slot of said first arm member and in said slot of said second end of said second arm member, and also includes a second pulley mounted in said slot in said first end of said second arm member, and further includes a roller member being mounted to one of said elongate end members of said frame of said rack member, and also includes a third pulley mounted to said cross member of said rack support member, said pulleys and said roller member being adapted to carry said cable.

8. An ATV lift and carry apparatus as described in claim 7, wherein said winch mounting member includes a pair of arcuate plate-like members, and also includes a pair of spacing members securely attached to and extending outwardly from one of said arcuate plate-like members and being in contactable relationship with the other of said arcuate plate-like members, and further includes a mounting plate support member being securely attached to and extending outwardly from one of said arcuate plate-like members, and also includes a winch mounting plate being adjustably fastened to said mounting plate support member and being adapted to support said winch.

9. An ATV lift and carry apparatus as described in claim 8, wherein each of said arcuate plate-like members of said winch mounting member includes a curved main portion which is adapted to engage about the axle of the ATV and also includes end portions having holes disposed therethrough.

10. An ATV lift and carry apparatus as described in claim 8, wherein said mounting plate support member and said winch mounting plate have holes disposed therethrough for allowing said winch mounting plate to be adjustably fastened with fastening members to said mounting plate support member.

11. An ATV lift and carry apparatus comprising:

a main support assembly being adapted to be securely attached to an ATV;

a hitch mounting member being adapted to adjustably attach to a hitch of the ATV;

a rack support member being pivotally mounted to said hitch mounting member;

a rack member being pivotally attached to said rack support member and being adapted to be supported upon the ATV;

a lift assembly for lifting objects upon said rack member;

wherein said main support assembly includes a first elongate member, a plurality of bracket members securely attached to said first elongate member and being adapted to fasten to the ATV, and also includes a first arm member having a first end and a second end, said second end of said first arm member being securely attached to said first elongate member, and further including a second arm member having a first end and a second end, said second end of said second arm member being pivotally attached to said first end of said first arm member, and also includes a mounting bracket being securely attached at said first end of said second arm member and being adapted to securely fasten to a back of the ATV;

wherein said first arm member includes a slot disposed in said first end thereof, and said second arm member includes slots disposed in said first and second ends thereof;

wherein said mounting bracket includes a main portion which is securely attached to said second arm member, and also includes end portions which are integrally connected to said main portion and which are angled relative to said main portion, each of said end portions having a plurality of holes disposed therethrough for mounting said mounting bracket to the ATV;

wherein said hitch mounting member includes a plate-like member having a plurality of holes disposed therethrough for adjustably mounting said hitch mounting member to the hitch of the ATV, and also includes brackets securely attached to sides of said plate-like member and extending outwardly therefrom; and wherein said rack support member includes a frame having an elongate end member, and also having elongate side members securely attached at ends of said elongate end member, and further having a cross member extending between and being securely attached to said elongate side members, and also having elongate converging members each having a first end being securely attached to a respective said elongate side member and each having a second end portion which is securely attached to said second end portion of the other said elongate converging member, said second end portions of said elongate converging members being pivotally attached with a fastener to said brackets of said hitching mounting member.

12. An ATV lift and carry apparatus as described in claim 11, wherein said rack member includes a frame having elongate end and side members and elongate cross members, and also includes a support bar being securely attached to and spaced from said frame, and further includes brackets being securely attached to one of said elongate end members of said frame for pivotally mounting said rack member to said elongate side members of said rack support member.

13. An ATV lift and carry apparatus as described in claim 12, wherein said lift assembly includes a winch mounting member which is adapted to securely fasten to an axle of the ATV, and also includes a winch being securely and removably mounted to said winch mounting member and having a motor, a spool connected to said motor, a cable carried by said spool and having a hook at an end of said cable, and a winch bracket member, and further includes a first pulley mounted in said slot of said first arm member and in said slot of said second end of said second arm member, and also includes a second pulley mounted in said slot in said first end of said second arm member, and further includes a roller member being mounted to one of said elongate end members of said frame of said rack member, and also includes a third pulley mounted to said cross member of said rack support member, said pulleys and said roller member being adapted to carry said cable.

14. An ATV lift and carry apparatus as described in claim 13, wherein said winch mounting member includes a pair of arcuate plate-like members, and also includes a pair of spacing members securely attached to and extending outwardly from one of said arcuate plate-like members and being in contactable relationship with the other of said arcuate plate-like members, and further includes a mounting plate support member being securely attached to and extending outwardly from one of said arcuate plate-like members, and also includes a winch mounting plate being adjustably fastened to said mounting plate support member and being adapted to support said winch.

15. An ATV lift and carry apparatus as described in claim 14, wherein each of said arcuate plate-like members of said winch mounting member includes a curved main portion which is adapted to engage about the axle of the ATV and also includes end portions having holes disposed therethrough.

16. An ATV lift and carry apparatus as described in claim 14, wherein said mounting plate support member and said winch mounting plate have holes disposed therethrough for allowing said winch mounting plate to be adjustably fastened with fastening members to said mounting plate support member.

17. An ATV lift and carry apparatus comprising:

a main support assembly being adapted to be securely attached to an ATV, said main support assembly including a first elongate member, a plurality of bracket members securely attached to said first elongate member and being adapted to fasten to the ATV, and also including a first arm member having a first end and a second end, said second end of said first arm member being securely attached to said first elongate member, and further including a second arm member having a first end and a second end, said second end of said second arm member being pivotally attached to said first end of said first arm member, and also including a mounting bracket being securely attached at said first end of said second arm member and being adapted to securely fasten to a back of the ATV, said first arm member including a slot disposed in said first end thereof, and said second arm member including slots disposed in said first and second ends thereof, said mounting bracket including a main portion which is securely attached to said second arm member, and also including end portions which are integrally connected to said main portion and which are angled relative to said main portion, each of said end portions having a plurality of holes disposed therethrough for mounting said mounting bracket to the ATV;

a hitch mounting member being adapted to adjustably attach to a hitch of the ATV, said hitch mounting member including a plate-like member having a plurality of holes disposed therethrough for adjustably mounting said hitch mounting member to the hitch of the ATV, and also including brackets securely attached to sides of said plate-like member and extending outwardly therefrom;

a rack support member being pivotally mounted to said hitch mounting member, said rack support member including a frame having an elongate end member, and also having elongate side members securely attached at ends of said elongate end member, and further having a cross member extending between and being securely attached to said elongate side members, and also having elongate converging members each having a first end being securely attached to a respective said elongate side member and each having a second end portion which is securely attached to said second end portion of the other said elongate converging member, said second end portions of said elongate converging members being pivotally attached with a fastener to said brackets of said hitching mounting member;

a rack member being pivotally attached to said rack support member and being adapted to be supported upon the ATV, said rack member including a frame having elongate end and side members and elongate cross members, and also including a support bar being securely attached to and spaced from said frame, and further including brackets being securely attached to one of said elongate end members of said frame for pivotally mounting said rack member to said elongate side members of said rack support member; and a lift assembly for lifting objects upon said rack member including a winch mounting member which is adapted to securely fasten to an axle of the ATV, and also including a winch being securely and removably mounted to said winch mounting member and having a motor, a spool connected to said motor, a cable carried by said spool and having a hook at an end of said cable, and a winch bracket member, and further including a first pulley mounted in said slot of said first arm member and in said slot of said second end of said second arm member, and also including a second pulley mounted in said slot in said first end of said second arm member, and further including a roller member being mounted to one of said elongate end members of said frame of said rack member, and also including a third pulley mounted to said cross member of said rack support member, said pulleys and said roller member being adapted to carry said cable, said winch mounting member including a pair of arcuate plate-like members, and also including a pair of spacing members securely attached to and extending outwardly from one of said arcuate plate-like members and being in contactable relationship with the other of said arcuate plate-like members, and further including a mounting plate support member being securely attached to and extending outwardly from one of said arcuate plate-like members, and also including a winch mounting plate being adjustably fastened to said mounting plate support member and being adapted to support said winch, each of said arcuate plate-like members of said winch mounting member including a curved main portion which is adapted to engage about the axle of the ATV and also including end portions having holes disposed therethrough, said mounting plate support member and said winch mounting plate having holes disposed therethrough for allowing said winch mounting plate to be adjustably fastened with fastening members to said mounting plate support member.

* * * * *